3,094,617
INFRA-RED DETECTING SYSTEMS
John Humphries, William C. Brown, and Allen G. McIntosh, Ottawa, Ontario, Canada, assignors to National Research Council, Ottawa, Ontario, Canada, a body corporate of Canada
Filed June 26, 1961, Ser. No. 119,675
4 Claims. (Cl. 250—83.3)

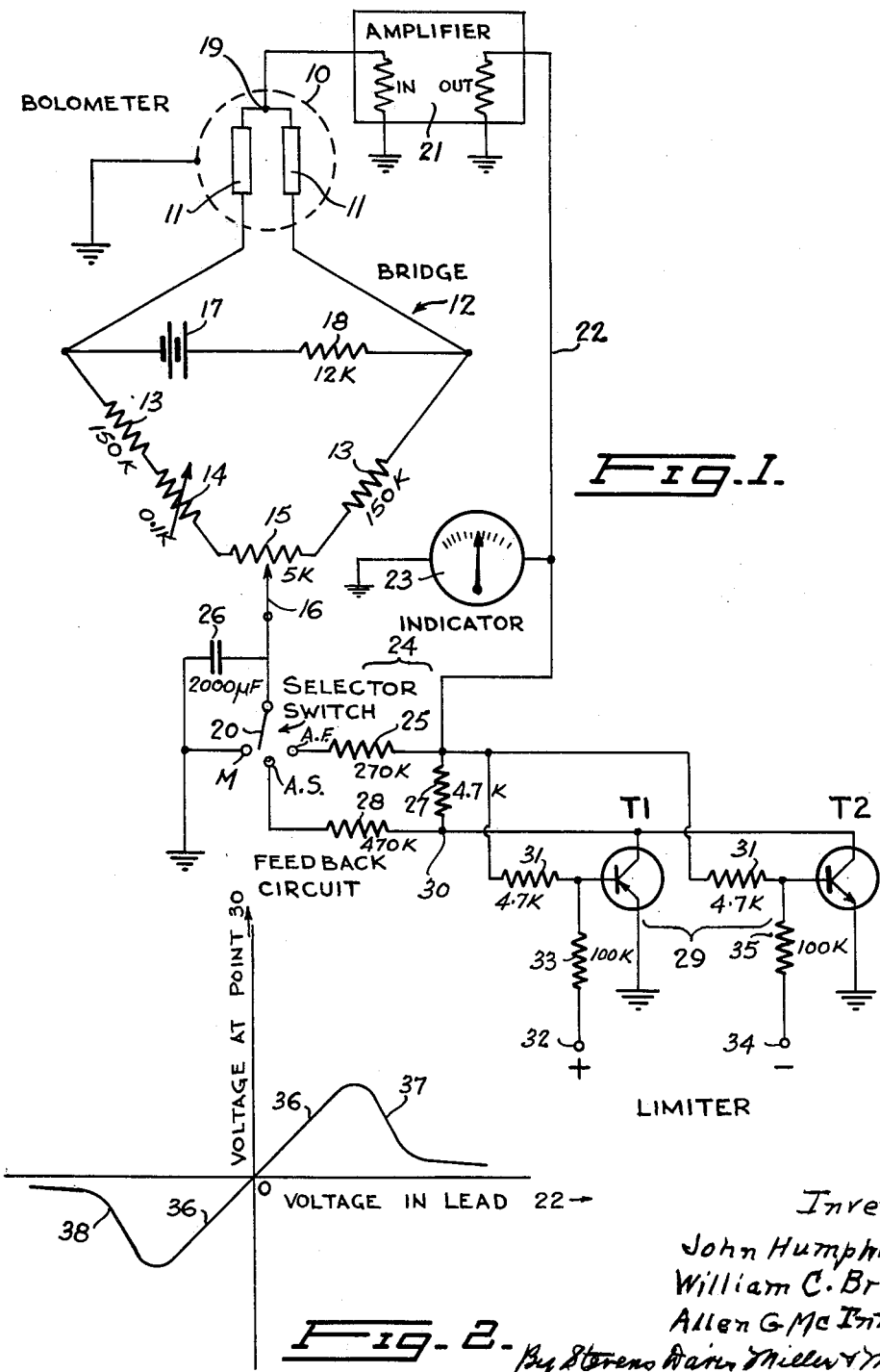

This invention relates to improvements in systems for detecting infra-red radiation received from hot bodies and, in particular, to systems for detecting changes in the received strength of such radiation. Such systems are used, for example, to scan an area and detect the movement into or out of such area of a vehicle, aircraft or other hot body, by means of the changes in level of infra-red radiation that such moving body produces.

The object of the present invention is to provide such a system with more versatility of operation than has been possible with existing systems. In particular, a system is desired that will automatically compensate for the effect of slow changes of level of infra-red radiation, and will continuously reset itself to a condition in which it is in readiness to detect any subsequent change, and in particular a subsequent change of substantial magnitude.

Further advantages of the invention will be apparent from the specific description that follows.

One example of a system according to the invention is illustrated in the accompanying drawings, in which:
FIGURE 1 is a circuit diagram of the system; and
FIGURE 2 is a diagram demonstrating a characteristic of the system.

In the circuit diagram, the preferred values of resistors and capacitors are shown in K (kilohms) and $\mu$f. (microfarads). These values are only intended as examples and not as essential features.

The infra-red radiation is detected by means of a conventional infra-red detector, such as a bolometer 10 having two elements 11 sensitive to infra-red radiation. In the conventional way, one of the elements 11 is shielded from external radiation, while the other element 11 is exposed to such radiation. When radiation is received, its effect on the resistance of the exposed element 11 unbalances the bridge 12 of which such elements 11 form two arms. The other two arms of the bridge 12 consist of main resistors 13, a fine balancing resistor 14 in one arm, and a coarse balancing resistor 15 interconnecting the two arms, the adjustable tap 16 of the resistor 15 defining one terminal of the output diagonal of the bridge. The input diagonal of the bridge consists of a direct current power supply 17 and a resistor 18, while the output diagonal consists of the tap 16 and the common point 19 of the bolometer elements 11.

Initially the bridge is balanced manually by adjustment of resistors 14 and 15. Thereafter, except when the selector switch 20 is in position M (for manual), the appearance of balance is achieved by the application of compensating voltages at tap 16. The circuits for accomplishing this result will now be explained.

The common point 19 feeds to an amplifier 21. The essential requirement of the amplifier 21, and there are many known circuits for achieving this end, is that it should accept a D.C. input signal from the bridge 12 and deliver an amplified D.C. output signal, proportional to the input signal, at the output lead 22. For example the amplifier may comprise an oscillator, a ring modulator for converting the received D.C. signal to A.C., a preamplifying stage, a quadrature rejection filter, attenuator, main amplifying stage and finally a phase sensitive detector delivering a D.C. output. Alternatively an A.C. bridge with corresponding modification to the amplifier could be used.

The output signal, arranged to be opposite in sign to the input signal, is fed to an indicator 23, represented in the drawing simply as a dial type instrument. It will be understood that the indicator may take a more complex form such as a recording instrument, and may include an audible alarm, if desired. The amplifier output is also fed to a feedback circuit shown generally at 24, the construction and function of which will now be described.

The feedback circuit 24 is connected to the bridge 12 through the selector switch 20 previously referred to. In addition to the manual position M, the selector switch has two automatic positions, A.F. (auto. fast) and A.S. (auto. slow).

When the selector switch 20 is in the A.F. position, the amplifier output lead 22 is connected through a resistor 25 directly to tap 16, with a comparatively large capacitance 26 between tap 16 and ground. The resistor 25 and capacitor 26 constitute a delay circuit, the time constant of which can be chosen as desired. Preferably it will be of the order of a few seconds. The output voltage from amplifier 21 will thus be applied as a gradually increasing voltage in series with the bridge 12.

By virtue of the gain of the amplifier 21, its initial output voltage will be far greater than that required in series with the bridge output voltage to compensate for the latter and reduce the input to the amplifier 21 to zero. The amplifier input will immediately fall away until an equilibrium condition is reached with the amplifier output differing from the bridge output only by a very small amount sufficient, as amplifier input, to yield the desired amplifier output. Thus the amplifier output is initially large, being equal to the bridge imbalance multiplied by the amplifier gain, but quickly falls to a small value substantially equal to the bridge imbalance itself, as the system takes up a new equilibrium position, that is recenters itself at the new radiation level.

The indicator 23 is thus energised briefly by the comparatively large transient amplifier output, to show that a change of received infra-red radiation has taken place; it then settles back to a substantially zero indication as soon as the system has recentered itself at the new equilibrium position.

When the selector switch 20 is in the A.S. position, the amplifier output lead 22 is connected to the tap 16 through resistors 27 and 28 in series, the latter having a substantially higher resistance than resistor 25, and hence an appreciably longer time constant in conjunction with capacitor 26 with which it forms a second delay circuit. The new equilibrium position thus takes longer to achieve in the auto slow (A.S.) position. In addition, a limiter 29 is now introduced into the feedback circuit, this limiter being connected across the resistor 27.

The limiter 29 consists of a PNP transistor T1 and an NPN transistor T2. The emitters of both transistors are grounded, and the collectors of both transistors are connected to the common point 30 between resistors 27 and 28. Each of the transistor bases is connected through a resistor 31 to lead 22. The base of transistor T1 is supplied with a small positive bias at 32 through resistor 33, and the base of transistor T2 is supplied with a corresponding negative bias at 34 through resistor 35.

The effect of the limiter 29 on the voltage at point 30 is demonstrated in FIGURE 2. Initially, there is no appreciable voltage on lead 22 and both transistors are non-conducting by reason of their reverse biases. This condition is represented by the origin O of FIGURE 2. Consequently, the limiter 29 has no effect on the operation of the feedback circuit which now consists of resistors 27 and 28 and capacitor 26 and which compensates for imbalance in the bridge 12 in the manner already described. This manner of operation will apply so long as the amplifier output remains comparatively small. This condition is represented by the initial portions 36 of the curve of FIGURE 2, where the voltage at point 30 applied for compensation of the bridge imbalance, follows linearly the voltage in lead 22. However, above a certain value of voltage in lead 22, which value can be chosen at will by the transistor bias level, one or other of the transistors begins to conduct and to shunt the feedback circuit. Assume the lead 22 rises positively. This positive voltage will appear on the base of transistor T2 to overcome its negative bias, so that transistor T2 starts to conduct and shunts point 30 to ground. The portion 37 of the curve of FIGURE 2 results. If the lead 22 goes negative, transistor T1 starts to conduct in a similar way, as represented by portion 38 of the curve.

Thus, for large outputs from the amplifier 21, which represents large changes in the level of radiation reaching the bolometer 10, the limiter 29 renders the feedback circuit 24 substantially ineffective so that the imbalance in the bridge remains without compensation. As a result, the high level of output from the amplifier is maintained and the indicator 23 continues to show a large indication. The system does not automatically recenter itself to zero at the new radiation level, as it would do if there were only a small change in radiation level (insufficient to render one of the transistors conducting), or if the selector switch were in the A.F. position when such recentering occurs regardless of the magnitude of the change of radiation level.

If the selector switch 20 is placed in the manual position M, tap 16 is grounded and any imbalance of the bridge can only be corrected by manual manipulation of resistors 14 and 15. Consequentially indicator 23 then continues to display any imbalance.

Consideration of the performance of the system described, will show it to have substantial flexibility. It can be operated in any one of three different ways, as chosen by the setting of the selector switch 20. When the switch is in the A.F. position the system provides a brief deflection at the indicator 23 every time there is a change of radiation level; after an interval sufficient for the purpose of this indication, the system recenters itself at the new radiation level, and it does this regardless of the magnitude of the indicator deflection. When the switch 20 is in the A.S. position, the system operates similarly to that just described for the A.F. position, except that the recentering action is rather slower, and provided the output of amplifier 21 is below a chosen level. Above such level, which represents a comparatively large hot body entering the field of scan of the bolometer 10, the limiter 29 substantially prevents the feedback action taking place. As a result the indicator 23 continues to show a deflection so long as the hot body remains in the field. This method of operation prevents the indicator 23 showing a large negative deflection when the hot body leaves the field; instead the indicator merely returns to zero. Finally, when switch 20 is in the M position, there is no feedback under any conditions and the indicator 23 deflects and remains deflected in accordance with any deviation of the radiation level from that for which the bridge is balanced.

We claim:
1. An infra-red detecting system comprising a bridge, an infra-red detector connected in said bridge as a part thereof whereby a change in the level of infra-red radiation received by said detector will modify the balance of the bridge, an amplifier, the input of said amplifier being connected to said bridge to detect an imbalance thereof, an indicator connected to the output of said amplifier to indicate such an imbalance, a feedback circuit connected to the output of said amplifier and including delay means and a limiter sensitive to the level of amplifier output, and a selector switch for connecting said feedback circuit to said bridge, said switch having a first position in which said amplifier output is connected to said bridge through said delay means whereby to impose on said bridge a gradually building up feedback voltage compensating for the imbalance of the bridge whereby in turn to reduce the amplifier output and recenter the system at the new radiation level, and a second position in which said amplifier is connected to said bridge through said delay means with said limiter connected as a shunt across said feedback circuit whereby for low values of the amplifier output a gradually building up feedback voltage is imposed on said bridge to compensate for the imbalance of the bridge whereby in turn to reduce the amplifier output and recenter the system at the new radiation level, while for higher values of the amplifier output said limiter renders said feedback voltage ineffective upon said bridge.

2. An infra-red detecting system comprising a bridge, an infra-red detector connected in said bridge as a part thereof whereby a change in the level of infra-red radiation received by said detector will modify the balance of the bridge, said bridge including means for balancing the bridge manually, an amplifier, the input of said amplifier being connected to said bridge to detect an imbalance thereof, an indicator connected to the output of said amplifier to indicate such an imbalance, a feedback circuit connected to the output of said amplifier and including two delay circuits and a limiter sensitive to the level of amplifier output, and a selector switch for connecting said feedback circuit to said bridge, said switch having a first position in which said feedback circuit is isolated from said bridge, a second position in which said amplifier output is connected to said bridge through a first said delay circuit whereby to impose on said bridge a gradually building up feedback voltage compensating for the imbalance of the bridge whereby in turn to reduce the amplifier output and recenter the system at the new radiation level, and a third position in which said amplifier is connected to said bridge through the second said delay circuit with said limiter connected as a shunt across said feedback circuit whereby for low values of the amplifier output a gradually building up feedback voltage is imposed on said bridge to compensate for the imbalance of the bridge whereby in turn to reduce the amplifier output and recenter the system at the new radiation level, while for higher values of the amplifier output said limiter renders said feedback voltage ineffective upon said bridge.

3. An infra-red detecting system comprising a bridge, an infra-red detector connected in said bridge as a part thereof whereby a change in the level of infra-red radiation received by said detector will modify the balance of the bridge, an amplifier, the input of said amplifier being connected to said bridge to detect an imbalance thereof, an indicator connected to the output of said amplifier indicate such an imbalance, and a feedback circuit connected to the output of said amplifier and to said bridge to impose on said bridge a feedback voltage compensating for such imbalance of the bridge whereby in turn to reduce the amplifier output and recenter the system at the new radiation level, wherein said feedback circuit includes means for delaying application of said feedback voltage to said bridge whereby to ensure indication of the initial amplifier output for an appreciable time by said indicator.

4. An infra-red detecting system comprising a bridge, an infra-red detector connected in said bridge as a part thereof whereby a change in the level of infra-red radiation received by said detector will modify the balance of the bridge, an amplifier, the input of said amplifier being connected to said bridge to detect an imbalance thereof, an indicator connected to the output of said amplifier to indicate such an imbalance, and a feedback circuit connected to the output of said amplifier and to said bridge to impose on said bridge a feedback voltage compensating for such imbalance of the bridge whereby in turn to reduce the amplifier output and recenter the system at the new radiation level, wherein said feedback circuit includes a limiter sensitive to the level of amplifier output and connected to render said feedback voltage ineffective upon said bridge as the value of said amplifier output rises above a predetermined level.

References Cited in the file of this patent

UNITED STATES PATENTS

| | | |
|---|---|---|
| 2,789,230 | Hutchins | Apr. 16, 1956 |
| 2,806,144 | Berger et al. | Sept. 10, 1957 |